(12) United States Patent
Kim et al.

(10) Patent No.: US 11,400,599 B2
(45) Date of Patent: Aug. 2, 2022

(54) STOCK MANAGEMENT ROBOT

(71) Applicant: LG ELECTRONICS INC., Seoul (KR)

(72) Inventors: Sunryang Kim, Seoul (KR); Jinho Sohn, Seoul (KR); Woong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 247 days.

(21) Appl. No.: 16/490,309

(22) PCT Filed: Jan. 30, 2019

(86) PCT No.: PCT/KR2019/001260
§ 371 (c)(1),
(2) Date: Aug. 30, 2019

(87) PCT Pub. No.: WO2020/158970
PCT Pub. Date: Aug. 6, 2020

(65) Prior Publication Data
US 2020/0398434 A1    Dec. 24, 2020

(51) Int. Cl.
*B25J 9/16* (2006.01)
*B25J 13/08* (2006.01)
*B25J 15/08* (2006.01)
*B25J 18/04* (2006.01)
*B25J 9/12* (2006.01)
*G06Q 10/08* (2012.01)

(52) U.S. Cl.
CPC .......... *B25J 9/1697* (2013.01); *B25J 9/1633* (2013.01); *B25J 13/08* (2013.01); *B25J 13/085* (2013.01); *B25J 15/08* (2013.01); *B25J 18/04* (2013.01); *B25J 9/123* (2013.01); *G06Q 10/087* (2013.01)

(58) Field of Classification Search
CPC ........ B25J 9/1697; B25J 9/1633; B25J 13/08; B25J 13/085; B25J 15/08; B25J 18/04; B25J 9/123; B25J 13/081; B25J 19/023; B25J 5/007; B25J 11/008; B25J 9/1679; B25J 15/0019; G06Q 10/087; G06Q 10/08; B65G 1/1371
USPC .......................................... 700/245–264, 259
See application file for complete search history.

(56) References Cited

U.S. PATENT DOCUMENTS

| | | | | |
|---|---|---|---|---|
| 7,783,383 B2* | 8/2010 | Eliuk | ..................... | A61J 3/002 |
| | | | | 700/245 |
| 7,930,066 B2* | 4/2011 | Eliuk | ................... | G07F 11/165 |
| | | | | 700/245 |
| 8,165,929 B2* | 4/2012 | Chudy | ................. | G06Q 10/087 |
| | | | | 705/28 |

(Continued)

FOREIGN PATENT DOCUMENTS

| | | |
|---|---|---|
| JP | 2007-217069 A | 8/2007 |
| KR | 10-2012-0012910 A | 2/2012 |

(Continued)

*Primary Examiner* — Jaime Figueroa
(74) *Attorney, Agent, or Firm* — Birch, Stewart, Kolasch & Birch, LLP

(57) ABSTRACT

Disclosed are a robot and a method of controlling the same, wherein a robot arm is moved until a pressure sensor provided at the robot arm senses a predetermined pressure, and the quantity of products arranged on a shelf is counted based on the operation of the robot arm.

15 Claims, 15 Drawing Sheets

(56) References Cited

U.S. PATENT DOCUMENTS

| | | | | |
|---|---|---|---|---|
| 8,965,561 | B2* | 2/2015 | Jacobus | G05D 1/0274 |
| | | | | 700/216 |
| 9,327,397 | B1* | 5/2016 | Williams | B25J 3/04 |
| 9,561,587 | B2* | 2/2017 | Wellman | B25J 9/1669 |
| 10,011,434 | B1* | 7/2018 | Messina | B65G 1/0492 |
| 10,565,548 | B2* | 2/2020 | Skaff | G06K 9/3216 |
| 10,949,797 | B2* | 3/2021 | Elazary | G06Q 30/06 |
| 10,984,378 | B1* | 4/2021 | Eckman | G06K 19/06131 |
| 11,087,272 | B2* | 8/2021 | Skaff | H04N 5/23238 |
| 2006/0259195 | A1* | 11/2006 | Eliuk | G07F 11/1657 |
| | | | | 700/245 |
| 2008/0077511 | A1* | 3/2008 | Zimmerman | G05D 1/0246 |
| | | | | 705/28 |
| 2010/0017407 | A1* | 1/2010 | Beniyama | G06K 9/00201 |
| | | | | 707/E17.016 |
| 2016/0167227 | A1* | 6/2016 | Wellman | B25J 9/1612 |
| | | | | 700/259 |
| 2016/0167228 | A1* | 6/2016 | Wellman | B25J 9/1697 |
| | | | | 700/218 |
| 2016/0297611 | A1* | 10/2016 | Williams | G05D 1/005 |
| 2016/0304280 | A1* | 10/2016 | Elazary | B25J 9/1697 |
| 2017/0286901 | A1* | 10/2017 | Skaff | G06N 3/008 |
| 2018/0005173 | A1 | 1/2018 | Elazary et al. | |
| 2018/0020145 | A1* | 1/2018 | Kotfis | G06Q 10/087 |
| 2018/0357601 | A1* | 12/2018 | Jacobus | B66F 9/063 |
| 2020/0017315 | A1* | 1/2020 | Yap | B25J 15/0441 |
| 2020/0156868 | A1* | 5/2020 | Bidram | B65G 1/0492 |
| 2020/0277139 | A1* | 9/2020 | Nakano | G06Q 10/087 |
| 2020/0316786 | A1* | 10/2020 | Galluzzo | B25J 9/162 |
| 2020/0324972 | A1* | 10/2020 | Cheng | B25J 9/104 |
| 2021/0133666 | A1* | 5/2021 | Eckman | G06T 7/62 |
| 2021/0374815 | A1* | 12/2021 | Smith | G07F 11/1657 |

FOREIGN PATENT DOCUMENTS

| KR | 10-2017-0094103 A | 8/2017 |
|---|---|---|
| KR | 10-2018-0109107 A | 10/2018 |

* cited by examiner

STOCK MANAGEMENT ROBOT

CROSS REFERENCE TO RELATED APPLICATIONS

This application is the National Phase of PCT International Application No. PCT/KR2019/001260, filed on Jan. 30, 2019, all of which is hereby expressly incorporated by reference into the present application.

TECHNICAL FIELD

The present invention relates to a stock management robot and a method of controlling the same, and more particularly to a robot system capable of counting the quantity of products arranged on a shelf and providing a management service and a method of controlling the same.

BACKGROUND ART

Robots have been developed for industrial purposes and have taken charge of a portion of factory automation. In recent years, the number of fields in which robots are utilized has increased. As a result, a medical robot and an aerospace robot have been developed. In addition, a home robot usable at home is being manufactured. Among such robots, a robot capable of autonomously traveling is called a mobile robot.

With an increase in the use of robots, the demand for robots capable of providing various kinds of information, entertainment, and services in addition to repeated performance of simple functions has increased.

As a result, a communication robot disposed in homed, stores, and public facilities so as to communicate with people is being developed.

In addition, various kinds of services using a mobile robot that is capable of autonomously traveling have been proposed. For example, a prior document (Korean Patent Application Publication No. 10-2017-0094103, Publication Date: Aug. 17, 2017) proposes a method of automatically investigating stock of products in a pallet track shelf in a logistics warehouse using an autonomous traveling robot and a 3D laser scanner.

According to the prior document, the stock quantity of product boxes in the pallet track shelf in the logistics warehouse is calculated. However, it is not possible to provide other services useful for stock management and product sales in addition to calculation of the stock quantity of product boxes.

In addition, according to the prior document, it is not possible to check the stock quantity of products placed in the inside of a shelf in a store, such as a large-scale mart or a shopping mall, whereby the method disclosed in the prior art is not suitable for a large-scale mart, in which products are arranged on a shelf in a line.

DISCLOSURE

Technical Problem

It is an object of the present invention to provide a robot capable of counting the quantity of products arranged on a shelf and a method of controlling the same.

It is another object of the present invention to provide a robot capable of counting the quantity of products arranged on a shelf even in the case in which the products are arranged on the shelf in a line and thus it is not possible to acquire an image of the inside of the shelf and a method of controlling the same.

It is another object of the present invention to provide a robot capable of moving products and a method of controlling the same.

It is another object of the present invention to provide a robot capable of moving products to the front of a shelf in the case in which a front space of the shelf is empty such that shopping customers can more easily retrieve the products, thereby improving customer convenience and sales efficiency, and a method of controlling the same.

It is a further object of the present invention to provide a robot capable of managing stock of products arranged on a shelf while autonomously moving and a method of controlling the same.

Technical Solution

In accordance with an aspect of the present invention, the above and other objects can be accomplished by the provision of a robot and a method of controlling the same, wherein the robot manages stock of products arranged on a shelf while autonomously moving.

In accordance with another aspect of the present invention, the above and other objects can be accomplished by the provision of a robot and a method of controlling the same, wherein a robot arm is operated to count the quantity of products arranged on a shelf and to move the products.

In accordance with another aspect of the present invention, the above and other objects can be accomplished by the provision of a robot and a method of controlling the same, wherein a robot arm is moved until a pressure sensor provided at the robot arm senses a predetermined pressure, and the quantity of products arranged on a shelf is counted based on the operation of the robot arm.

In accordance with a further aspect of the present invention, the above and other objects can be accomplished by the provision of a stock management robot including a driving unit for moving a main body, an image acquisition unit including at least one camera disposed on one surface of the main body, a robot arm, at least a portion of which is extended so as to be far away from the main body, is introduced between a shelf and products arranged on the shelf, and is pulled toward the main body, and a control unit for performing control such that the robot arm is pulled toward the main body until a pressure sensor provided at the robot arm senses a predetermined pressure and counting the quantity of products arranged on the shelf based on the movement distance of the robot arm and the thickness of each product determined from an image of the products acquired through the image acquisition unit.

The control unit may control the operation of the robot arm such that the products arranged on the shelf are pulled toward the main body, whereby the products are moved to the front of a display stand.

The robot arm may be rotatable at least 90 degrees, and the control unit may perform control such that the robot arm is rotated based on at least one of the kind, size, or arrangement form of the products arranged on the shelf so as to be introduced between the shelf and the products arranged on the shelf.

In addition, the robot arm may be movable in the longitudinal direction of the main body, and the control unit may perform control such that the robot arm is moved in the longitudinal direction in response to the height of the shelf.

The robot arm may include a moving unit configured to be pulled toward to the main body after being introduced between the shelf and the products arranged on the shelf, a stationary unit, to which the pressure sensor is mounted, and a linear actuator for length adjustment.

In this case, the control unit may extend the linear actuator such that the moving unit is introduced between the shelf and the products arranged on the shelf, may rotate the moving unit when the moving unit reaches a target position, may monitor a value sensed by the pressure sensor mounted to the stationary unit while pulling the linear actuator, and may perform control such that the operation of the linear actuator is stopped when the pressure sensor senses the predetermined pressure.

In addition, the moving unit may include a contact portion configured to contact the products, and at least the product that contacts the contact portion may be pulled according to movement of the moving unit.

In addition, the stationary unit may be fixed to the closest product or to the end of the shelf.

Meanwhile, the stock management robot may further include a communication unit for communicating with a server.

The control unit may perform control such that the communication unit transmits the image of the products acquired through the image acquisition unit or product information identified based on the image of the products acquired through the image acquisition unit to the server and receives information about the thickness of each product from the server.

In addition, the control unit may perform control such that information about the quantity of products is transmitted to the server through the communication unit.

The robot arm may be received in the main body in a standby state.

The robot arm may include a pair of robot arms disposed so as to be spaced apart from each other by a predetermined distance, and the robot arms may be extended from the left side and the right side of the main body, respectively, in order to pull products between the robot arms toward the main body.

The image acquisition unit may include a plurality of cameras disposed in the longitudinal direction of the main body, and the control unit may recognize the shelf and the products arranged on the shelf based on a panoramic image obtained by composing images acquired through the cameras.

The stock management robot may further include a storage unit for storing information about a display stand including the shelf.

Advantageous Effects

According to at least one of the embodiments of the present invention, it is possible to count the quantity of products arranged on a shelf. Particularly, even in the case in which products are arranged on a shelf in a line and thus it is not possible to acquire an image of the inside of the shelf, it is possible to count the quantity of products, thereby improving convenience and accuracy.

In addition, according to at least one of the embodiments of the present invention, it is possible to move products and to move the products to the front of a shelf in the case in which a front space of the shelf is empty such that customers can more easily retrieve the products, thereby improving customer convenience and sales efficiency.

In addition, according to at least one of the embodiments of the present invention, it is possible to manage stock of products arranged on a shelf while autonomously moving.

Various other effects of the present invention will be directly or suggestively disclosed in the following detailed description of the invention.

BEST MODE

Reference will now be made in detail to embodiments, examples of which are illustrated in the accompanying drawings. However, the present invention may be embodied in many different forms and should not be construed as being limited to the embodiments set forth herein.

Meanwhile, in the following description, with respect to constituent elements used in the following description, the suffixes "module" and "unit" are used or combined with each other only in consideration of ease in the preparation of the specification, and do not have or indicate mutually different meanings. Accordingly, the suffixes "module" and "unit" may be used interchangeably.

It will be understood that although the terms "first," "second," etc., may be used herein to describe various components, these components should not be limited by these terms. These terms are only used to distinguish one component from another component.

Figure 1:
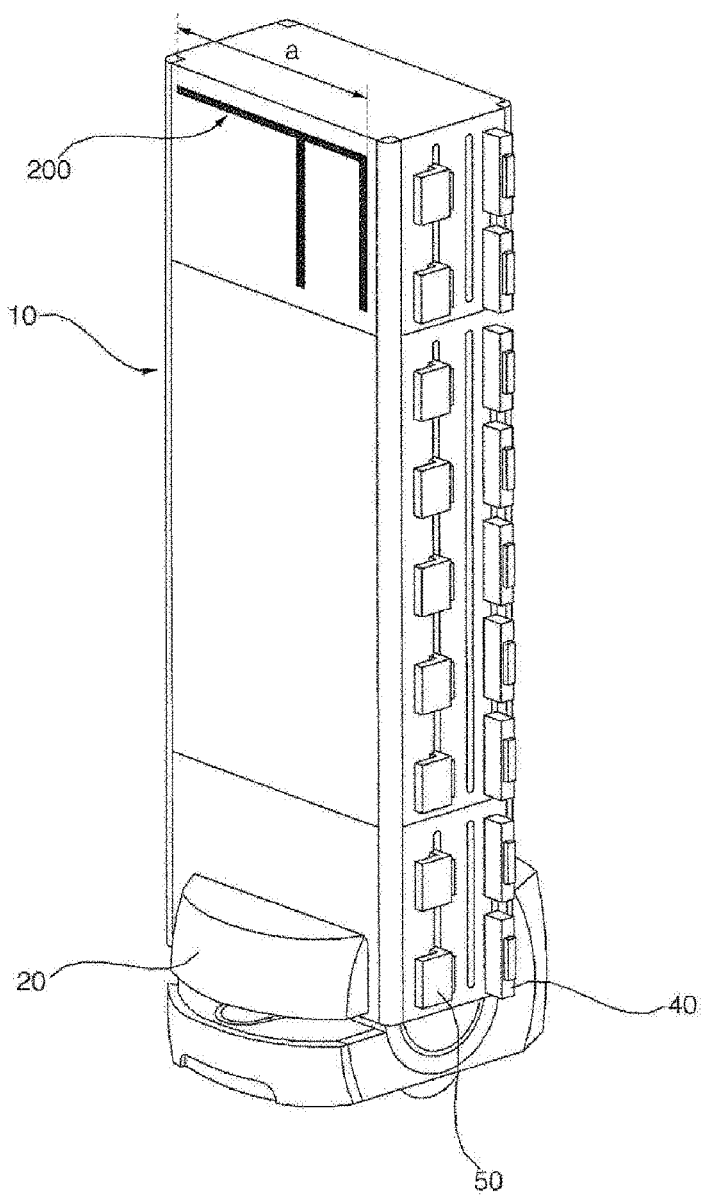
FIG. 1 is a view showing the external appearance of a robot according to an embodiment of the present invention.
Figure 2A:
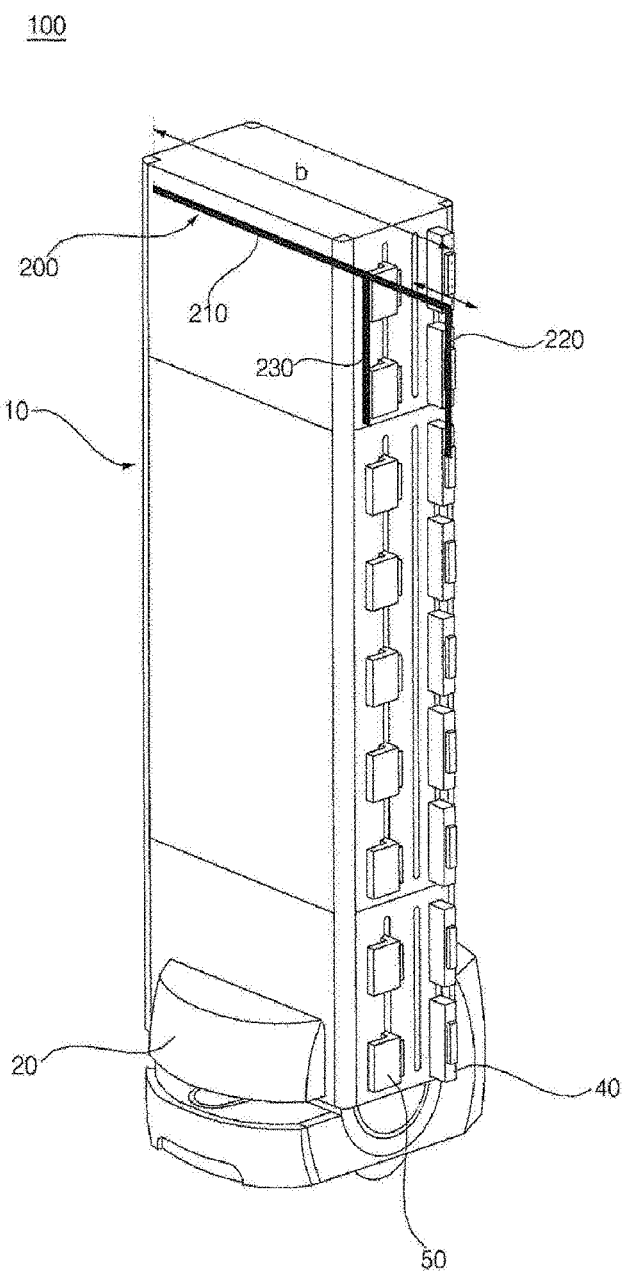
FIGS. 2a to 2c are reference views illustrating a robot arm included in the robot according to the embodiment of the present invention.
Figure 2B:
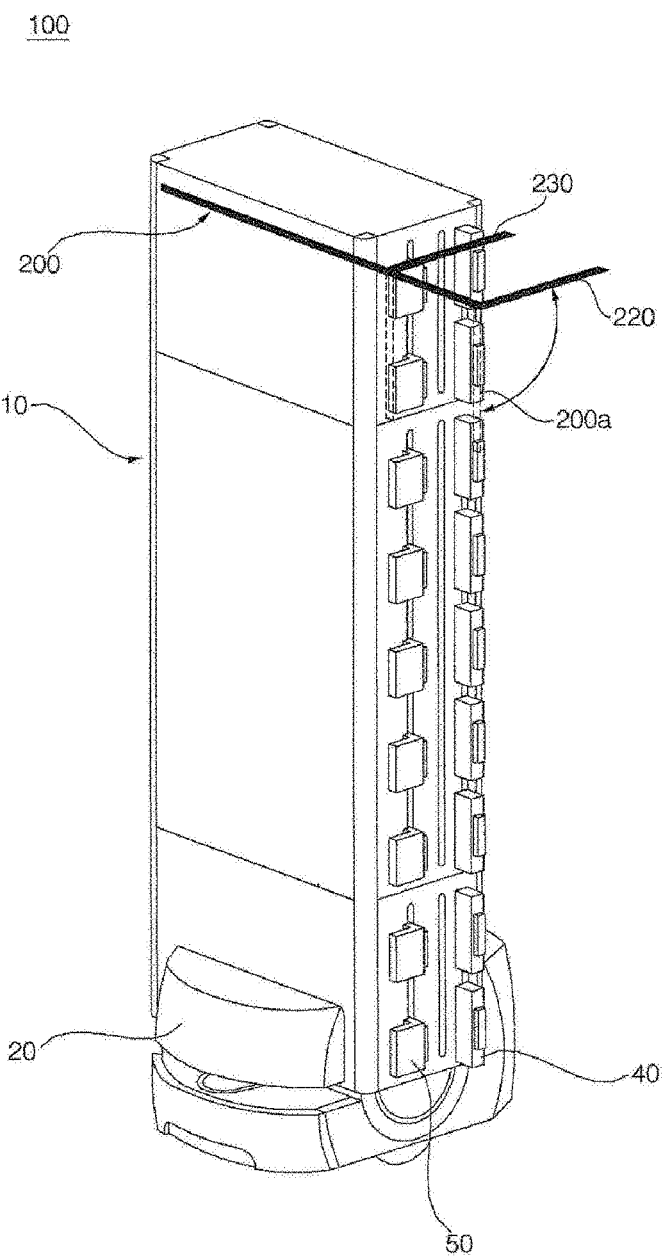
Figure 2C:
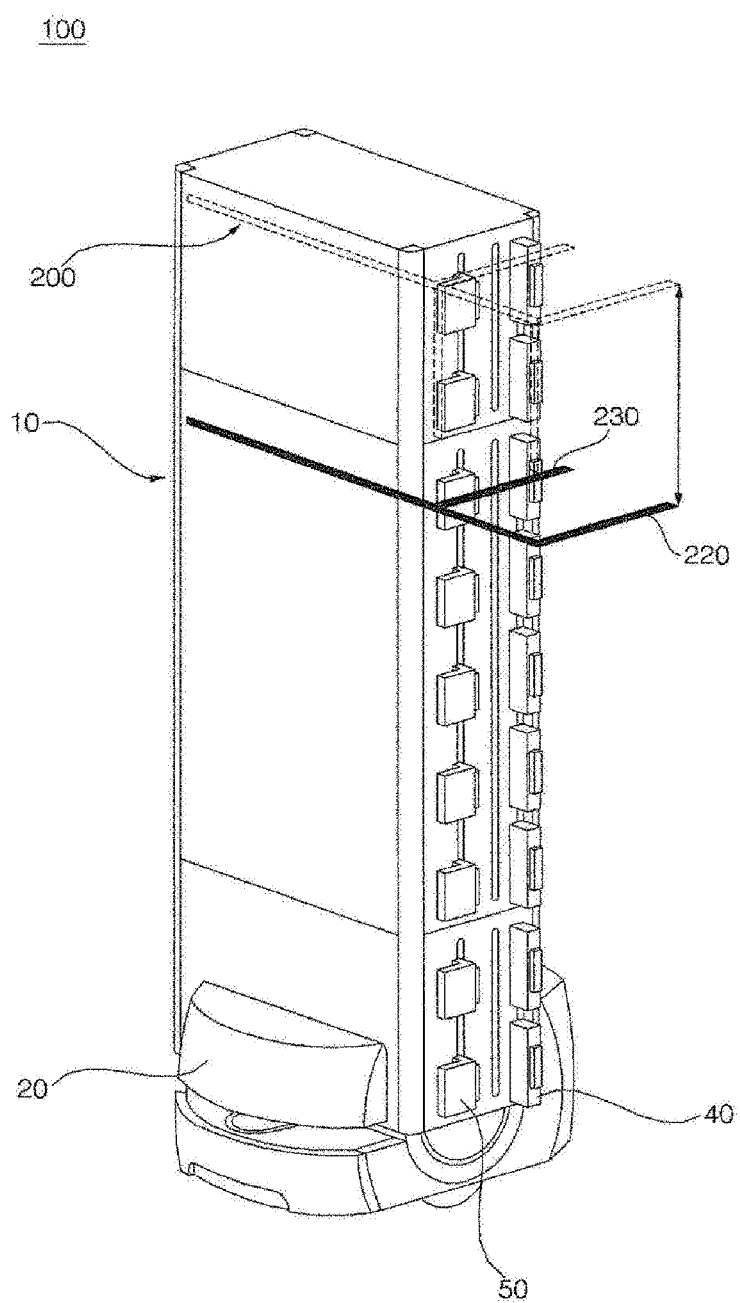

FIG. 1 is a view showing the external appearance of a robot according to an embodiment of the present invention, and FIGS. 2a to 2c are reference views illustrating a robot arm included in the robot according to the embodiment of the present invention.

Referring to the figures, the robot 100 according to the embodiment of the present invention may include a main body 10, which defines the external appearance thereof and in which various components are received, and a traveling module 20 for moving the main body 10.

The traveling module 20 may include a wheel, a motor, and a sensor.

In some embodiments, the sensor may be disposed on the outer surface of the traveling module 20. An obstacle sensor, such as an ultrasonic sensor (not shown), for sensing an obstacle may be disposed on the outer surface of the traveling module 20.

For example, the ultrasonic sensor may be a sensor for measuring the distance between an obstacle and the robot 100 using an ultrasonic signal. The ultrasonic sensor may sense an obstacle that is near the robot 100.

In an example, a plurality of ultrasonic sensors may be provided in order to sense obstacles that are near the robot 100 in all directions. The ultrasonic sensors may be located along the circumference of the traveling module 20 so as to be spaced apart from each other.

In some embodiments, the traveling module 20 may include at least one opening, in which a sensor necessary for traveling may be disposed. For example, light detection and ranging (lidar) may be disposed in the traveling module 20 so as to face the opening. Consequently, the lidar may emit a laser through the opening.

In addition, the robot 100 may travel while recognizing an object around the robot, i.e. an obstacle, based on the lidar.

In some embodiments, the robot 100 may travel while recognizing a space and an object based on an image captured by a camera array 40 or a separate camera.

At least one camera 40 and an at least one illuminator 50 may be disposed on one surface of the main body 10. More preferably, a camera array 40 including a plurality of cameras and an illuminator array 50 including a plurality of illuminators are disposed on one surface of the main body 10. Consequently, the illuminator array 50 illuminate the main body 10 in one direction, and the camera array 40 may more accurately capture an image necessary for traveling, shelf recognition, and product recognition.

Meanwhile, the main body 10 may be formed so as to be longer in the upward-downward direction, and the illuminators included in the illuminator array 50 and the cameras included in the camera array 40 may be disposed in the upward-downward direction. That is, the illuminators included in the illuminator array 50 and the cameras included in the camera array 40 may be disposed in the longitudinal direction of the main body 10.

Various components, such as a robot arm 200, may be received in the main body 10. The robot arm 200 may be received in the main body 10 in a standby state, and may be extended and operated in an operation state.

For example, as shown in FIG. 1, the robot arm 200 may be received in the main body 10 when not in use. Consequently, the robot arm 200 does not impede the traveling, standing by, and storage of the robot 100. In addition, as shown in FIGS. 2a to 2c, the robot arm 200 may be extended outwards so as to be operable when in use. For example, the distance between opposite ends of the robot arm 200 may be increased from 'a' in the storage state to 'b' in the extension state.

The robot 100 according to the present invention may manage the stock of products arranged on a shelf using the robot arm 200. Consequently, the robot 100 according to the present invention may also be referred to as a stock management robot, a shelf management robot, or a product management robot.

Referring to FIG. 2a, the robot arm 200 may be extended so as to be far away from the main body 10. Consequently, the robot arm 200 may be introduced between a shelf and products arranged on the shelf.

In addition, the robot arm 200 may be extracted so as to be close to the main body 10 after being introduced between the shelf and the products arranged on the shelf. Consequently, the robot arm 200 may pull the products so as to be close to the main body 10. In addition, the robot arm 200 may be used to count the quantity of products.

Meanwhile, the robot arm 200 may be rotatable at least 90 degrees. After the robot arm 200 is rotated to an angle appropriate for a predetermined task, therefore, the robot arm may be moved or may be extended and contracted. For example, the robot arm 200 may be rotated based on at least one of the kind, size, or arrangement form of the products arranged on the shelf so as to be easily introduced between the shelf and the products arranged on the shelf.

FIG. 2b exemplarily shows the case in which the robot arm 200 is rotated 90 degrees from the state of FIG. 2a.

The robot arm 200 in the state of FIG. 2a may be advantageous to be introduced between products, and the robot arm 200 in the state of FIG. 2b may be advantageous to be introduced between the upper end or the lower end of the shelf and a product.

Meanwhile, the robot arm 200 may be received in the main body, and may be extended and moved vertically when necessary. That is, the robot arm 200 may be movable in the longitudinal direction of the main body 10. Consequently, the robot arm 200 may be moved in the longitudinal direction of the main body 10 in response to the height of a shelf on which products, the quantity of which is to be counted and which are to be managed, are arranged.

FIG. 2c exemplarily shows the case in which the robot arm 200 is moved downwards in the longitudinal direction of the main body 10 from the state of FIG. 2b.

As previously described, the robot arm 200 may be configured to be movable, rotatable, and extendable and contractible. To this end, the robot arm 200 may include a linear actuator and a motor.

The robot arm 200 according to the embodiment of the present invention may include a moving unit 220 configured to be pulled toward the main body after being introduced between the shelf and the products arranged on the shelf, a stationary unit 230, to which a pressure sensor is mounted, and a linear actuator 210 for length adjustment.

The linear actuator 210, which is a device that transmits power through linear motion and is configured to linearly extend and contract, may perform an extension (pushing) operation and a contraction (pulling) operation. The linear actuator 210 may be realized using one of various known systems, to which the present invention is not limited. For example, the linear actuator 210 may include a cylinder, which may be reciprocated in the longitudinal direction thereof in order to move members connected thereto. Here, the connected members may be the moving unit 220 and the stationary unit 230.

Figure 4:
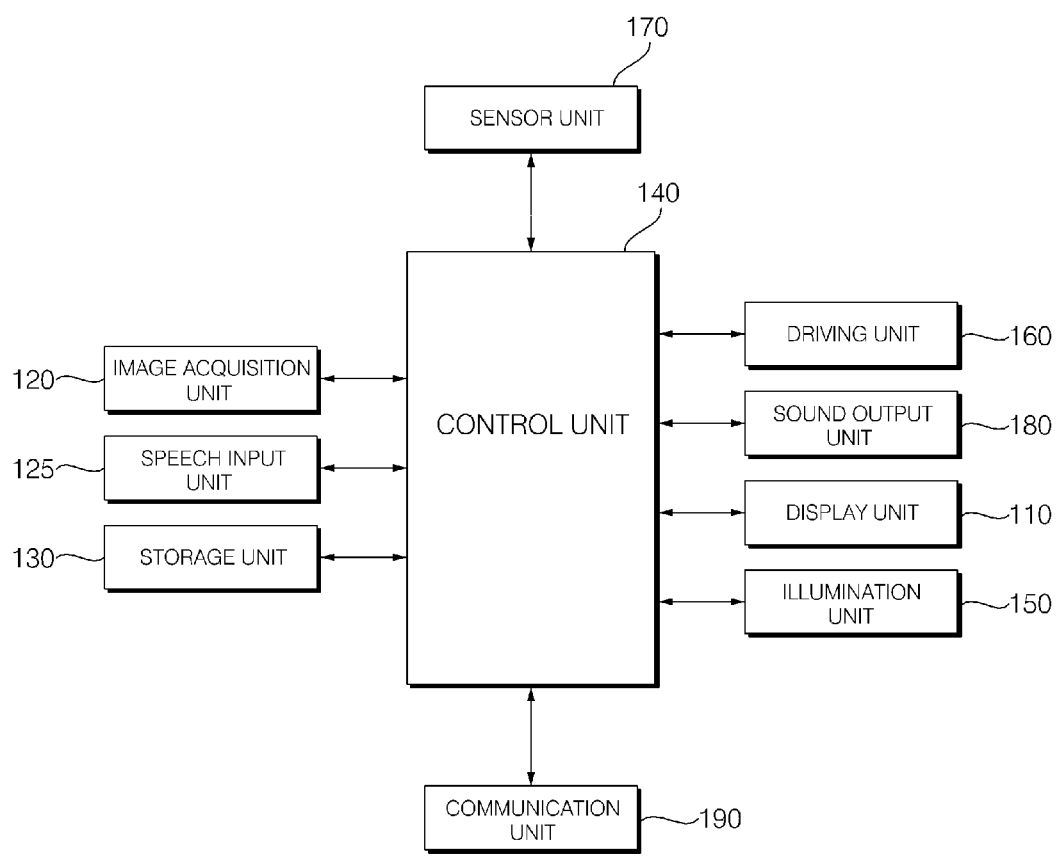
FIG. 4 is a block diagram showing the control relationship between principal components of the robot according to the embodiment of the present invention.

The robot arm 200 may be operated under the control of a control unit 140 (see FIG. 4). For example, the control unit 140 may extend the linear actuator 210 such that the moving unit 220 is introduced between the shelf and the products arranged on the shelf, may monitor a value sensed by the pressure sensor mounted to the stationary unit 230 while pulling the linear actuator 210 when the moving unit 220 reaches a target position, and may perform control such that the operation of the linear actuator 210 is stopped when the pressure sensor senses a predetermined pressure.

Subsequently, the control unit 140 may count the quantity of products based on the extended or contracted length of the linear actuator 210.

Meanwhile, in the case in which rotating the moving unit 220 is advantageous to count and arrange the products, the control unit 140 may rotate the moving unit 220 before pulling the linear actuator 210 after the moving unit 220 reaches the target position.

Meanwhile, the moving unit 220 may include a contact portion configured to contact the products. Here, the contact portion may be formed so as to have a predetermined size and area appropriate to push and pull the products. In addition, the contact portion may be manufactured so as to have a wedge-shaped structure, in which the contact portion is appropriate to be introduced and to push and pull the products. Consequently, at least the product that contacts the contact portion may be moved, e.g. pulled, according to the movement of the moving unit 220.

The stationary unit 230, to which the pressure sensor is mounted, becomes a criterion necessary to determine whether the product has been pulled to the stationary unit 230. To this end, the stationary unit 230 may be fixed to the closest product or to the end of the shelf.

Alternatively, the stationary unit 230 may sense only pressure without being fixed to a specific position.

The stationary unit 230, which is a criterion necessary to determine whether the products are located between the moving unit 220 and the stationary unit 230, i.e. whether the space between the moving unit 220 and the stationary unit 230 is filled with the products, is not necessarily fixed. Consequently, the stationary unit 230 may be configured to be movable.

Depending on settings, the stationary unit 230 may be stopped after being moved to the closest product or to the closest end of the shelf. Alternatively, the linear actuator 210 may be operated such that the stationary unit 230 is located at the closest product or at the closest end of the shelf.

Referring to the figures, the robot 100 according to the embodiment of the present invention may include an "F"-shaped robot arm 200, which includes a linear actuator 210, a bar-shaped moving unit 220, a bar-shaped stationary unit 230, and a pressure sensor (not shown) disposed at the bar-shaped stationary unit 230.

The robot arm 200 may be rotated 90 degrees in order to move the products, and may then move the products located in the shelf forwards while moving the moving unit 220 forwards using the linear actuator 210.

The control unit 140 may count the stock quantity of products located in the shelf based on information about the distance that the linear actuator 210 has been moved and the thickness of each product.

Meanwhile, the robot arm 200 may include a pair of robot arms disposed so as to be spaced apart from each other by a predetermined distance.

Figure 3:
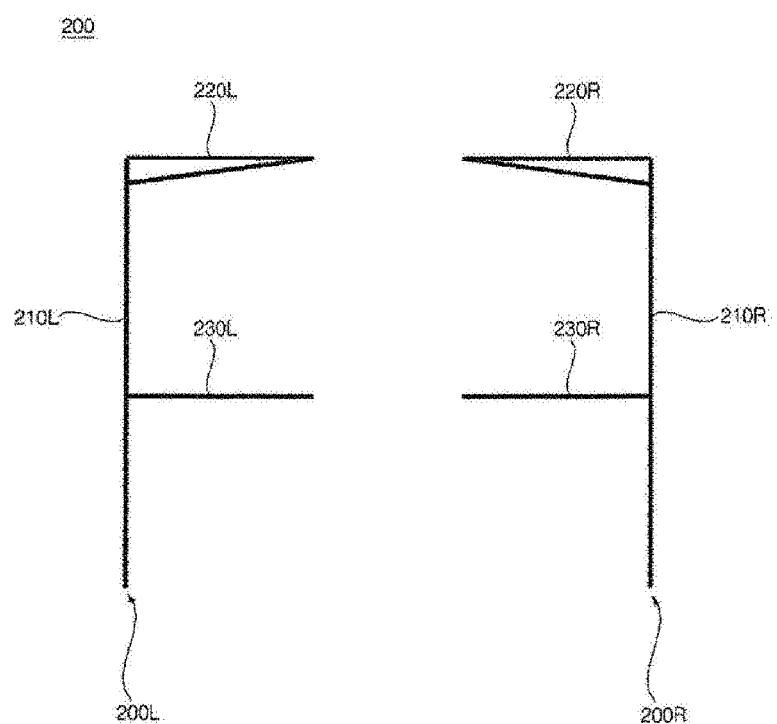
FIG. 3 is a reference view illustrating a pair of robot arms included in the robot according to the embodiment of the present invention.

FIG. 3 is a reference view illustrating a pair of robot arms included in the robot according to the embodiment of the present invention.

Referring to FIG. 3, a pair of robot arms 200L and 200R may be extended and operated, in the same manner as the arms of a human, in order to count the quantity of products and to move the products. Consequently, it is possible to more stably move the products.

The robot arms 200L and 200R may be extended from the left side and the right side of the main body 10, respectively, in order to pull the products between the robot arms 200L and 200R toward the main body 10. Here, the left side and the right side of the main body may mean the left side and the right side of the camera array 40 and the illuminator array 50 when the robot arms 200L and 200R are operated.

The robot arms 200L and 200R may include linear actuators 210L and 210R, bar-shaped moving units 220L and 220R, bar-shaped stationary units 230L and 230R, and pressure sensors (not shown) disposed at the bar-shaped stationary units 230L and 230R, respectively.

According to the present invention, the robot 100, which is configured to autonomously travel, includes the robot arms 200L and 200R, which are devices configured to be introduced into the shelf, in order to move the products located in the shelf to the front of the shelf and to count the quantity of products remaining in the shelf.

The "F"-shaped robot arms 200L and 200R based on the linear actuators 210L and 210R may be introduced from the left side and the right side, may be pulled forwards to move the products to the front of the shelf, may measure the pressure of the pressure sensors, such as load cells, mounted to the bar-shaped stationary units 230L and 230R in order to determine whether the products come into tight contact with the stationary units, and may count the stock quantity of products based on the distances that the bar-shaped moving units 220L and 220R have been moved and the thickness of each product.

According to the present invention, the robot arms 200L and 200R may be introduced into the shelf in order to accurately count the stock quantity of products located at a position that cannot be viewed by a camera.

In addition, the products located inside the shelf may be moved to the front of the shelf during counting of the quantity of products.

FIG. 4 is a block diagram showing the control relationship between principal components of the robot according to the embodiment of the present invention.

Referring to FIG. 4, the robot 100 according to the embodiment of the present invention may include a control unit 140 for controlling the overall operation of the robot 100, a storage unit 130 for storing various kinds of data, a driving unit 160 for moving the main body 10, an image acquisition unit 120 including at least one camera disposed on one surface of the main body 10, and a communication unit 190 for transmitting and receiving data to and from another device, such as a server.

The control unit 140 may control the image acquisition unit 120, the storage unit 130, the communication unit 190, the driving unit 160, and a sensor unit 170 in the robot 100, whereby the control unit 140 may control the overall operation of the robot 100.

The storage unit 130, which stores various kinds of information necessary to control the robot 100, may include a volatile or nonvolatile recording medium. Examples of the recording medium, which stores data readable by a microprocessor, may include a hard disk drive (HDD), a solid state disk (SSD), a silicon disk drive (SDD), a ROM, a RAM, a CD-ROM, a magnetic tape, a floppy disk, and an optical data storage device.

The image acquisition unit 120 may include at least one camera for capturing an image of a predetermined range.

The image acquisition unit 120, which captures an image of the periphery of the robot 100, an external environment, etc., may include a camera module. For capture efficiency, a plurality of cameras may be installed at predetermined positions.

The image acquisition unit 120 may capture an image for stock management. For example, the image acquisition unit 120 may capture an image for recognition of a display stand, shelves, products, etc. Preferably, the camera array 40, described with reference to FIGS. 1 to 2c, may be included.

Figure 5:
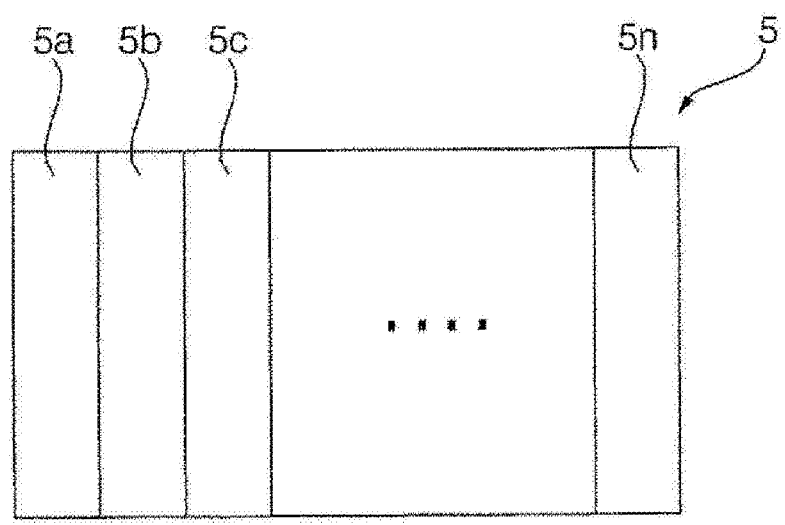
FIG. 5 is a reference view illustrating image recognition of the robot according to the embodiment of the present invention.

FIG. 5 is a reference view illustrating image recognition of the robot according to the embodiment of the present invention.

It is possible to acquire a plurality of horizontal images 5a, 5b, 5c, . . . , and 5n through the camera array 40. The control unit 140 may connect the horizontal images 5a, 5b, 5c, . . . , and 5n to each other in order to generate a panoramic image 5. The panoramic image 5 may be extended in the horizontal direction depending on the shape of each display stand and the number of display stands disposed in the horizontal direction.

The control unit 140 may be trained using the panoramic image 5 in order to recognize the display stands, shelves, and products.

Meanwhile, the image acquisition unit 120 may capture an image for user recognition. The control unit 140 may determine an external situation or may recognize a user based on the image captured by the image acquisition unit 120.

In some embodiments, the control unit 140 may perform control such that the robot 100 travels based on an image captured by at least one camera of the image acquisition unit 120.

Meanwhile, the image acquired by the image acquisition unit 120 may be stored in the storage unit 130.

The driving unit 160 may move the main body 10 under the control of the control unit 140. The driving unit 160 may include the traveling module 20 described with reference to FIGS. 1 to 2c.

The driving unit 160 may include at least one driving wheel (not shown) for moving the main body of the robot 100. The driving unit 160 may include a driving motor (not shown) connected to the driving wheel for rotating the driving wheel. Driving wheels may be provided at left and right sides of the main body, and will be hereinafter referred to as a left wheel and a right wheel.

The left wheel and the right wheel may be driven by a single driving motor. If necessary, however, a left wheel driving motor for driving the left wheel and the right wheel driving motor for driving the right wheel may be individually provided. The direction in which the main body travels may be changed to the left or to the right based on the difference in the rotational speed between the left wheel and the right wheel.

The driving unit 160 may include and operate at least one robot arm 200. Depending on circumstances, the driving unit 160 may be classified into a travel driving unit for travel driving and a robot arm driving unit for robot arm driving. Here, the travel driving unit may include the traveling module 20 described with reference to FIGS. 1 to 2c.

Meanwhile, the robot 100 may include a sensor unit 170 including sensors for sensing various kinds of data related to the operation and state of the robot 100.

The sensor unit 170 may include a pressure sensor disposed at the robot arm 200.

The sensor unit 170 may further include an operation sensor for sensing the operation of the robot 100 and outputting operation information. For example, a gyro sensor, a wheel sensor, or an acceleration sensor may be used as the operation sensor.

The sensor unit 170 may include an obstacle sensor for sensing an obstacle. The obstacle sensor may include an infrared sensor, an ultrasonic sensor, an RF sensor, a geomagnetic sensor, a position sensitive device (PSD) sensor, a cliff sensor for sensing whether a cliff is present on a floor within a traveling area, and a lidar (light detection and ranging).

Meanwhile, the obstacle sensor senses an object, particularly an obstacle, present in the direction in which the robot 100 travels (moves), and transmits information about the obstacle to the control unit 140. At this time, the control unit 140 may control the motion of the robot 100 depending on the position of the sensed obstacle.

Meanwhile, the control unit 140 may perform control such that the operation state of the robot 1000 or user input is transmitted to a server through the communication unit 190.

The communication unit 190 may include at least one communication module, through which the robot 100 may be connected to the Internet or to a predetermined network and may communicate with another device.

In addition, the communication unit 190 may be connected to a communication module provided in the server in order to process transmission and reception of data between the robot 100 and the server.

In some embodiments, the robot 100 may further include an illumination unit 150 including at least one light-emitting module. For example, the illuminator array described with reference to FIGS. 1 to 2c may be included.

In some embodiments, the robot 100 may further include a speech input unit 125 for receiving user speech input through a microphone.

The speech input unit 125 may include or may be connected to a processing unit for converting analog sound into digital data such that a user speech input signal can be recognized by the control unit 140 or the server.

Meanwhile, the storage unit 130 may store data for speech recognition, and the control unit 140 may process the user speech input signal received through the speech input unit 125, and may perform a speech recognition process.

Meanwhile, the speech recognition process may be performed by the server, not by the robot 100. In this case, the control unit 140 may control the communication unit 190 such that the user speech input signal is transmitted to the server.

Alternatively, simple speech recognition may be performed by the robot 100, and high-dimensional speech recognition, such as natural language processing, may be performed by the server.

Meanwhile, the control unit 140 may perform control such that the robot 100 performs a predetermined operation based on the result of speech recognition.

Meanwhile, the robot 100 may include a display unit 110 and/or a sound output unit 180 in order to display predetermined information in the form of an image or to output the predetermined information in the form of sound.

In some embodiments, the display unit 110 may be connected to a touchpad in a layered structure so as to constitute a touchscreen. In this case, the display unit constituting the touchscreen may also be used as an input device for allowing a user to input information by touch, in addition to an output device.

The robot 100 according to the present invention may move the products located in the shelf to the front of the shelf using the robot arm 200, and may also check the quantity of products located in the shelf from which a camera image cannot be acquired.

At least a portion of the robot arm 200 may be extended so as to be far away from the main body 10 under the control of the control unit 140, may be introduced between the shelf and the products arranged on the shelf, and may be pulled toward the main body 10.

The control unit 140 may perform control such that the robot arm 200 is pulled toward the main body 10 until the pressure sensor provided at the robot arm 200 senses a predetermined pressure, and may count the quantity of products arranged on the shelf based on the movement distance of the robot arm 200 and the thickness of each product determined from an image of the products acquired through the image acquisition unit 120.

The control unit 140 may pull the robot arm 200 until the pressure sensor detects a predetermined pressure level or higher after the robot arm 200 is introduced into the inside of the shelf.

At this time, the control unit 140 may control the operation of the robot arm 200 such that the products arranged on the shelf are pulled toward the main body. Consequently, counting the quantity of products, arranging the products, and managing the products are simultaneously achieved, whereby efficiency may be improved.

The control unit 140 may perform control such that the communication unit 190 transmits the image of the products acquired through the image acquisition unit 120 to a predetermined server (not shown) and receives information about the thickness of each product from the server. The server may identify the received image of the products, and may transmit product information including at least the information about the thickness of each product to the robot 100.

Alternatively, the control unit 140 may recognize the produces arranged on the shelf on which work is performed based on the image of the products acquired through the image acquisition unit 120.

The image acquisition unit 120 may include a plurality of cameras 40 disposed in the longitudinal direction of the main body 10, and the control unit 140 may recognize the shelf and the products arranged on the shelf based on a panoramic image 5 obtained by composing images acquired through the cameras 40.

In this case, the control unit 140 may perform control such that the communication unit 190 transmits product information identified based on the image of the products acquired through the image acquisition unit 120 to the server and receives information about the thickness of each product from the server. The server may identify the received image of the products, and may transmit product information including at least the information about the thickness of each product to the robot 100.

In some embodiments, the control unit 140 may directly identify the thickness of each product based on the image of the products acquired through the image acquisition unit 120.

Meanwhile, the storage unit 130 may store information about a display stand including the shelf. Here, the information about the display stand may include information about the size, such as the height, of the display stand and information about the size of a plurality of shelves included in the display stand and the distance between the shelves. Such information may be received from the server in advance, or may be directly input by a user.

Meanwhile, the control unit 140 may count the quantity of the products arranged on a predetermined shelf based on information about the movement distance of the robot arm 200 and the thickness of each product.

When not in use, the robot arm 200 may be received in the main body 10, as shown in FIG. 1. When in use, the robot arm 200 may be extended out of the main body 10 and then operated, as shown in FIGS. 2a to 2c.

As described with reference to FIGS. 1 to 2c, the robot arm 200 may be realized so as to be movable, rotatable, and extendable and contractible.

The robot arm 200 may be rotatable at least 90 degrees, and the control unit 140 may perform control such that the robot arm 200 is rotated based on at least one of the kind, size, or arrangement form of the products arranged on the shelf so as to be introduced between the shelf and the products arranged on the shelf.

For example, the control unit 140 may determine whether it is preferred to introduce the robot arm 200 without being changed or to introduce the robot arm after rotating the robot arm a predetermined angle based on the image acquired by the image acquisition unit 120.

If necessary, the control unit 140 may introduce the robot arm 200 into the inside of the shelf without contacting the products after rotating the robot arm a predetermined angle.

In addition, the robot arm 200 may be movable in the longitudinal direction of the main body 10, and the control unit 140 may perform control such that the robot arm 200 is moved in the longitudinal direction in response to the height of the shelf.

The robot arm 200 according to the embodiment of the present invention may include a moving unit 220 configured to be pulled toward the main body 10 after being introduced between the shelf and the products arranged on the shelf, a stationary unit 230, to which a pressure sensor is mounted, and a linear actuator 210 for length adjustment.

More preferably, as described with reference to FIG. 3, the robot arm 200 includes a pair of robot arms 200L and 200R disposed so as to be spaced apart from each other by a predetermined distance.

Figure 6A:
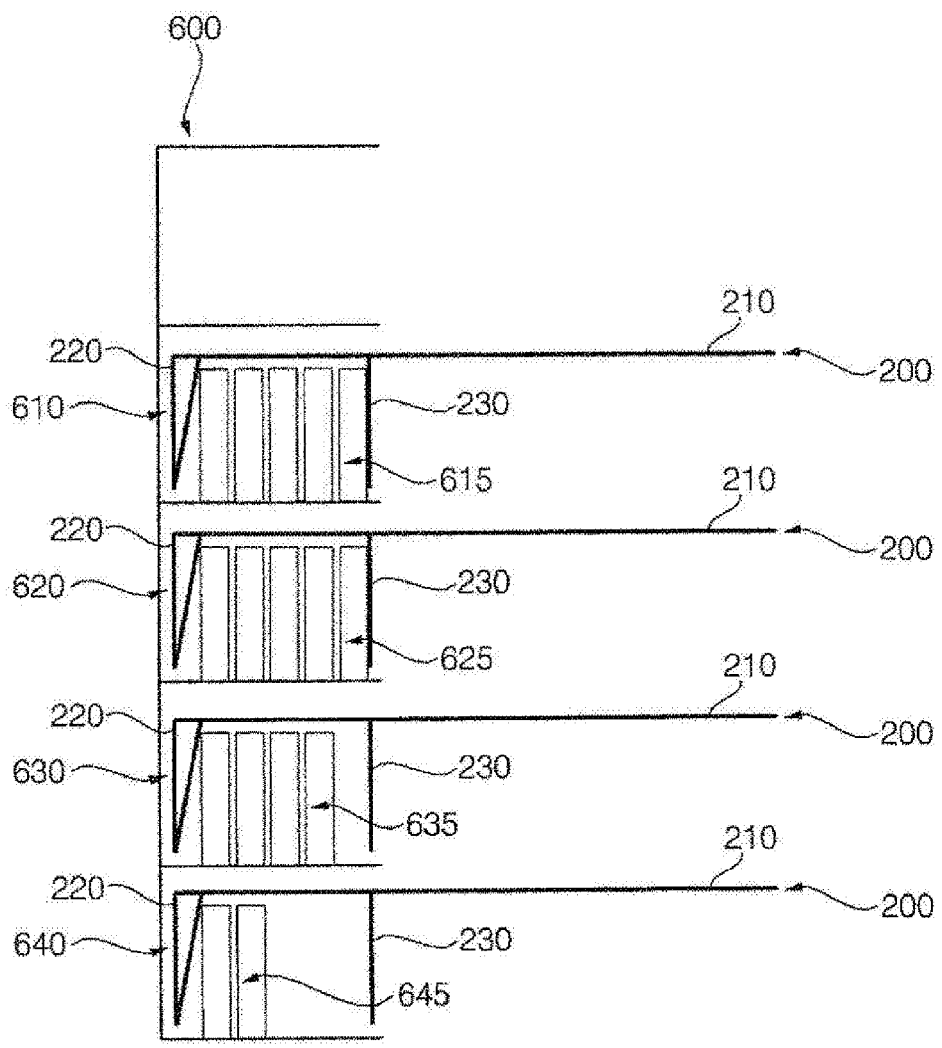
FIGS. 6a and 6b are reference views illustrating a method of counting products arranged on a shelf performed by the robot according to the embodiment of the present invention.
Figure 6B:
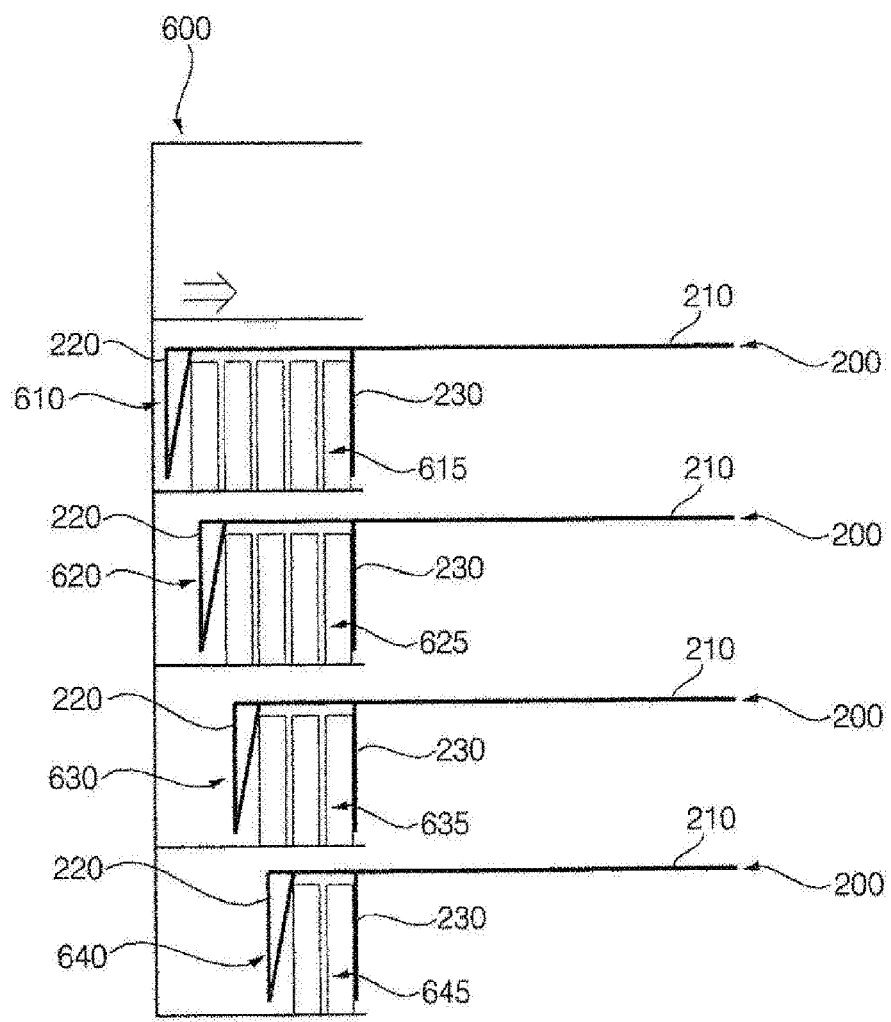

FIGS. 6a and 6b are reference views illustrating a method of counting products arranged on a shelf performed by the robot according to the embodiment of the present invention.

The control unit 140 may extend the linear actuator 210 such that the moving unit 220 is introduced between the shelf and the products arranged on the shelf.

If necessary, the control unit 140 may introduce the robot arm 200 between the shelf and the products arranged on the shelf after rotating the robot arm.

When the moving unit 220 reaches a target position, the control unit 140 may rotate at least the moving unit 220 in order to move the products if necessary.

FIGS. 6a and 6b show the state in which the robot arm 200 is rotated 90 degrees after the robot arm 200 is introduced into the inside of a shelf 610, 620, 630, or 640 from the state of FIG. 3, when viewed from above.

The moving unit 220 may include a wedge-shaped contact portion configured to contact a product arranged farthest inside the shelf 610, 620, 630, or 640. Alternatively, the entity of the moving unit 220 may be manufactured so as to have a wedge-shaped structure. That is, the overall shape of the moving unit 220 may be a wedge, and the contact portion may be one surface of the moving unit 220.

According to the movement of the moving unit 220, therefore, at least the product that contacts the contact portion may be pulled.

Meanwhile, the stationary unit 230 may be fixed to the closest product or to the outer end of the shelf so as to be set as a reference position.

Alternatively, the stationary unit 230 may sense only pressure without being fixed to a specific position.

Referring to FIG. 6a, the moving unit 220 may be introduced farthest inside the shelf 610, 620, 630, or 640, i.e. between the shelf 610, 620, 630, or 640 and a product 615, 6235, 635, or 645.

Referring to FIG. 6b, the control unit 140 may monitor a value sensed by the pressure sensor mounted to the stationary unit 230 while pulling the linear actuator 210 in order to determine whether the product 615, 6235, 635, or 645 comes into tight contact with the stationary unit.

When the predetermined pressure is sensed by the pressure sensor, the control unit 140 may perform control such that the operation of the stationary unit 230 is stopped.

Subsequently, the control unit 140 may count the stock quantity of products based on the distance that the moving unit 220 has been moved from the state of FIG. 6a until the moving unit 220 is stopped.

For example, the distance, obtained by subtracting the movement distance of the moving unit 220 from the space length of the shelf, 450 mm, may be divided by the thickness of each product in order to count the quantity of products.

Alternatively, the distance between the moving unit 220 and the stationary unit 230 may be calculated based on the movement distance of the moving unit 220, and the distance between the moving unit 220 and the stationary unit 230 may be divided by the thickness of each product in order to count the quantity of products.

Meanwhile, the control unit 140 may perform control such that information about the quantity of products is transmitted to the server through the communication unit 190. As a result, a manager may monitor stock in a store and the operation of the robot 100.

In order to check stock in the store in real time, the quantity of products arranged in the inside of the shelf must be counted. In particular, it is well known that the shelf located at the height of the eyes of customers is a golden line, the sales rate of products on which is high. Consequently, it is important to check and manage the quantity of products arranged on the shelf in real time. That is, real-time checking of stock in the store is useful for stock management, marketing, and product sales promotion.

According to the present invention, it is possible for the robot 100 to count the quantity of products arranged in the inside of the shelf in the store. In addition, it is also possible for the robot 100 to pull the products arranged in the inside of the shelf forwards.

Conventionally, in the case in which a customer retrieves a product located at the front of the shelf, a sales clerk must move the products arranged in the inside of the shelf to the front of the shelf.

According to the present invention, however, the work of counting the products arranged in the inside of the shelf in real time and at the same time moving the products to the front of the shelf is automated, whereby work efficiency of sales clerks is improved.

Figure 7:
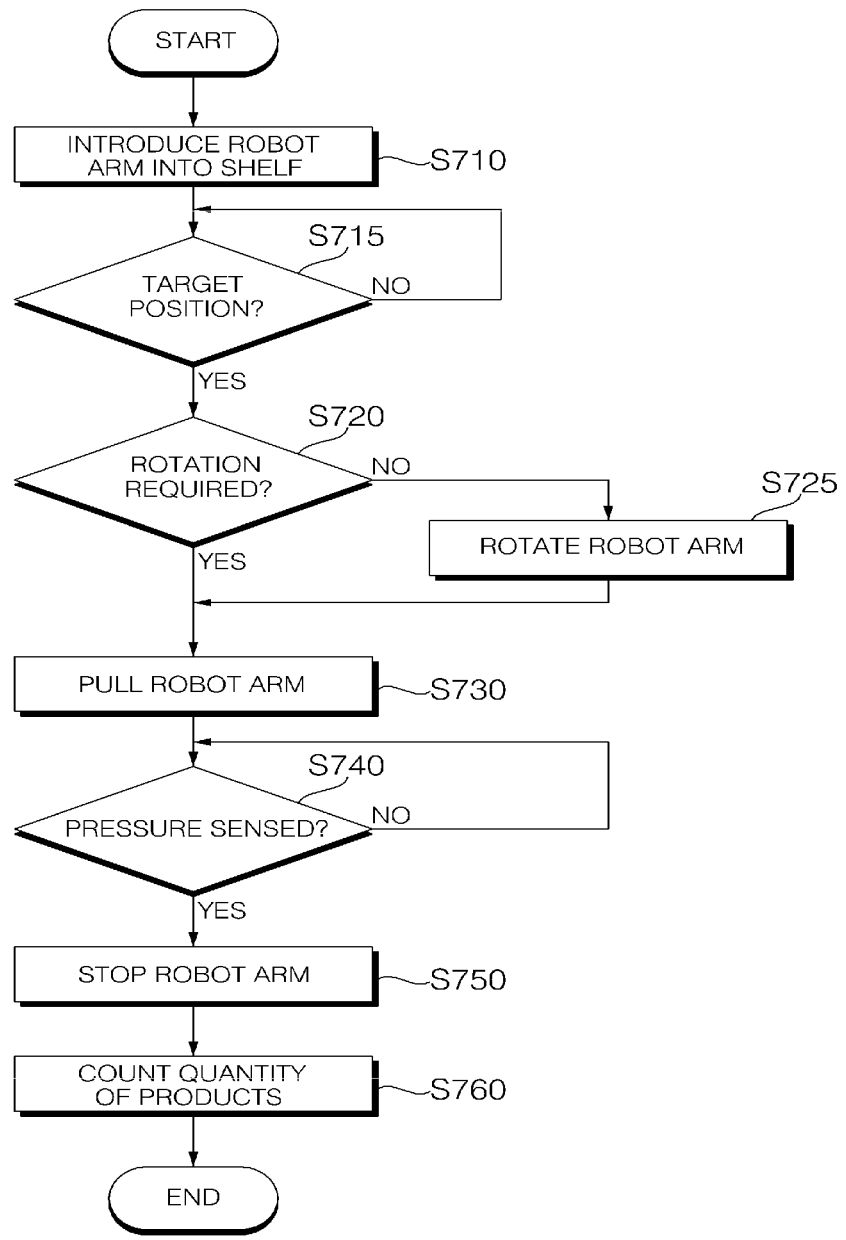
FIG. 7 is a flowchart showing a method of controlling the robot according to the embodiment of the present invention.

FIG. 7 is a flowchart showing a method of controlling the robot according to the embodiment of the present invention.

The robot 100 according to the embodiment of the present invention may introduce the robot arm 200, which includes the wedge-shaped moving unit 220, the stationary unit 230, to which the pressure sensor is mounted, and the linear actuator 210 for length adjustment, into a shelf (S710).

The control unit 140 may extend the linear actuator 210 in order to push the robot arm 200 into an upper gap between the shelf and products.

When the moving unit 220 reaches a target position such as the end of the shelf (S715) and when it is necessary to rotate the robot arm 200 as the result of pushing the robot arm 200 into the upper gap between the shelf and the products (S720), the control unit 140 may rotate at least the moving unit 220 (S725).

For example, when the moving unit 220 reaches the end of the shelf, the moving unit 220 may be rotated 90 degrees in order to move the products.

Subsequently, the control unit 140 pulls the linear actuator 210 (S730), and reads a value of the pressure sensor mounted to the stationary unit 230 (S740).

When a predetermined pressure is sensed (S740), the control unit 140 may stop the operation of the linear actuator 210 in order to stop the robot arm 200 (S750), and may check the stock quantity of products based on the movement distance and the linear actuator 210 and the thickness of each product (S760).

At this time, the thickness of each product may be obtained by analyzing an image acquired through the image acquisition unit 120 or by recognizing a barcode in order to identify the product and then retrieving information about the product from a database.

Alternatively, the product image or identified product information may be transmitted to the server, and product information including the thickness of the product may be received from the server.

Figure 8:
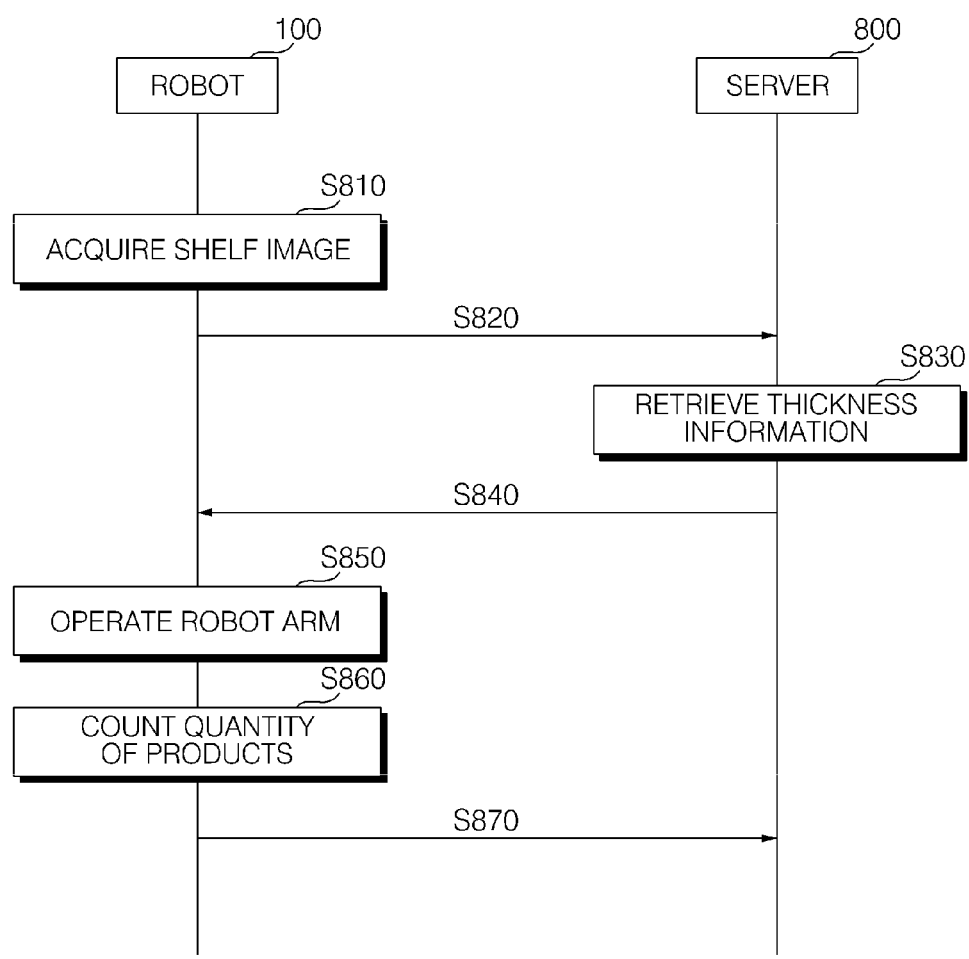
FIG. 8 is a flowchart showing a method of controlling the robot according to the embodiment of the present invention and a server.

FIG. 8 is a flowchart showing a method of controlling the robot according to the embodiment of the present invention and a server.

Referring to FIG. 8, the robot 100 may autonomously travel along display stands and shelves in order to acquire an image (S810).

The robot 100 may transmit the acquired image to the server 800 (S820).

The server 800 may recognize a product from the received image and retrieve at least thickness information of the product (S830), and may transmit the thickness information to the robot 100 (S840).

Alternatively the robot 100 may recognize the product, and may acquire product information, such as the width, depth, and height of the product, over a network.

For example, the robot 100 may recognize the product from the acquired image, and may transmit the recognized product information to the server 800.

The server 800 may retrieve thickness information of the product from a database based on the received product information (S830), and may transmit the thickness information to the robot 100 (S840).

In some embodiments, the control unit 140 may determine from the product information whether the product can be counted by the robot or it is necessary to rotate the robot 90 degrees. For example, the control unit 140 may determine that a product that is fragile, such as a bottle, or a product that is stacked, such as a can, is not counted.

Upon determining that the product is countable, the robot 100 may extend the robot arm 200 in order to count the product (S850) and may move the product to the front of the shelf (S860), as described with reference to FIGS. 1 to 7.

In some embodiments, the robot 100 may transmit information about the quantity of products to the server 800 (S870). Consequently, the server 800 is capable of recording and managing stock in the store and the operation of the robot 100.

Meanwhile, a method of recognizing images acquired through a plurality of cameras and counting the quantity of products arranged on shelves in a store, such as a mart may be used.

FIGS. 9a to 9d are reference views illustrating a method of counting products arranged on shelves based on image recognition.

Figure 9A:
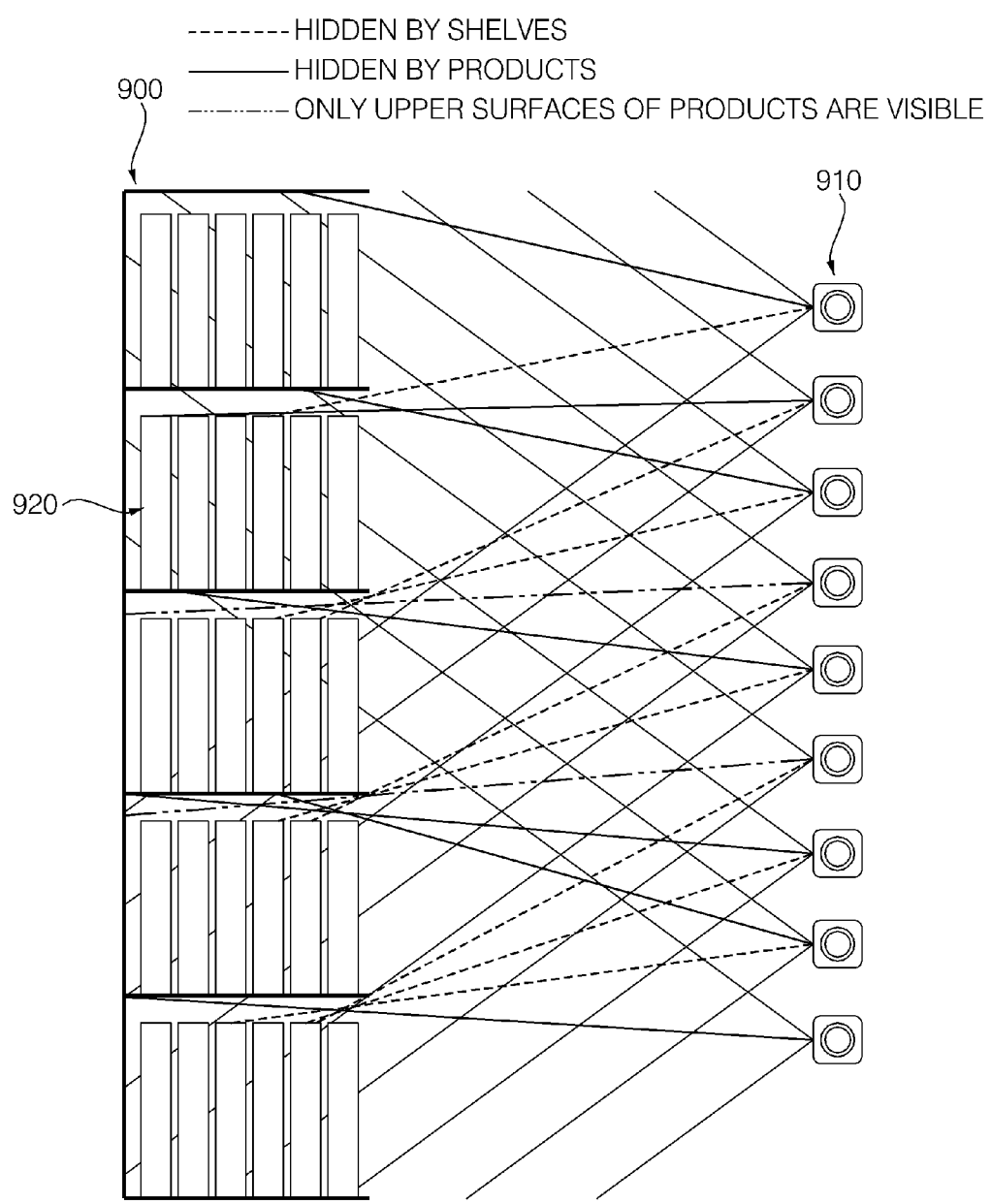
FIGS. 9a to 9d are reference views illustrating a method of counting products arranged on shelves based on image recognition.

Referring to FIG. 9a, it is possible to acquire images of a display stand 900 including a plurality of shelves and products arranged on the shelves using a plurality of cameras 910.

However, products arranged in the inside of a specific shelf 920 may be hidden by other shelves and the front products, whereby only the upper surfaces of the products may be visible or the products may not be visible at all.

As a result, it is difficult to obtain the inside image due to the shelves and the products. Even in the case in which the inside image is obtained, only the upper surfaces of the products are visible, whereby it is not possible to accurately count the stock quantity of products.

Figure 9B:
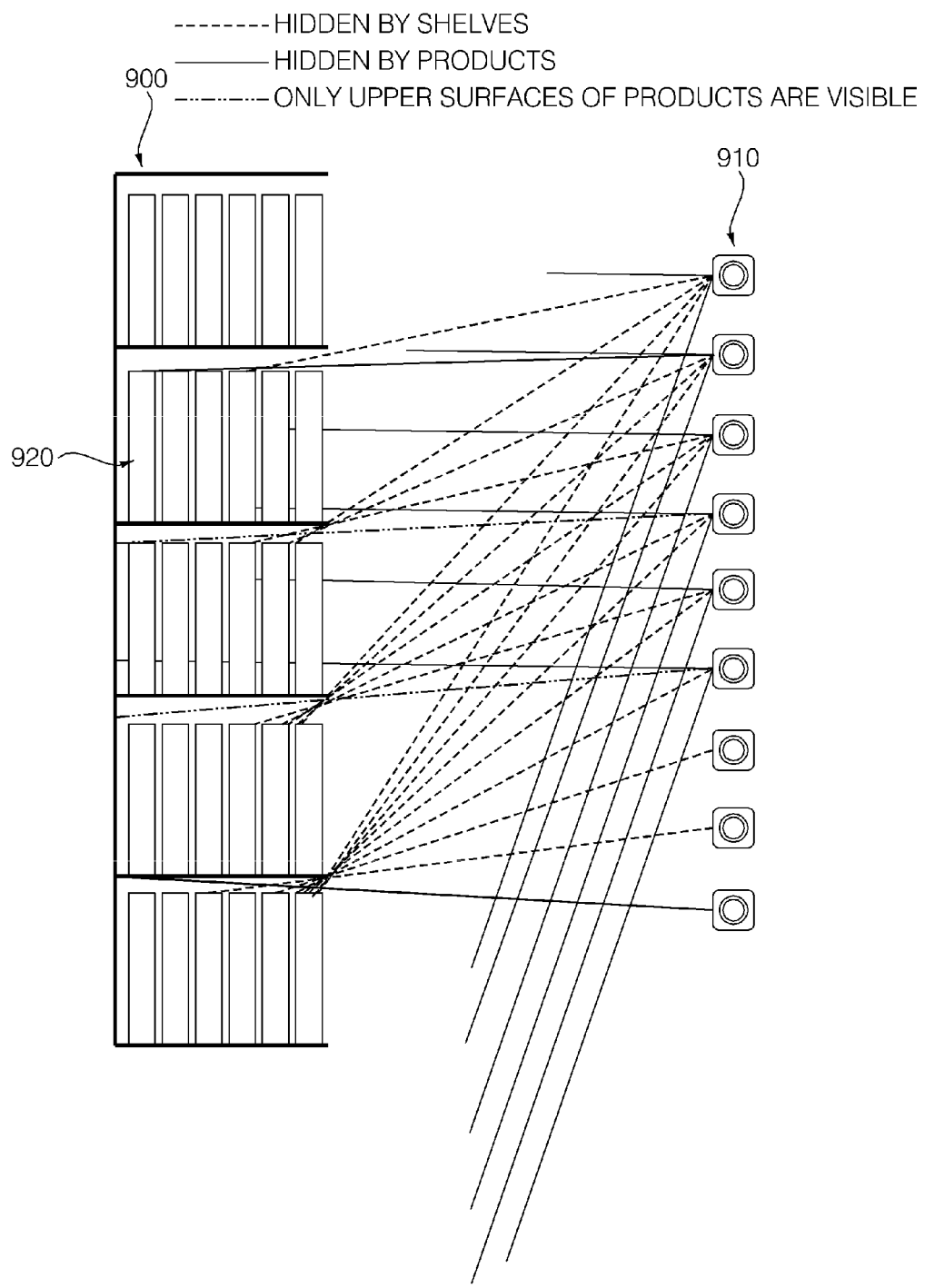
Figure 9C:
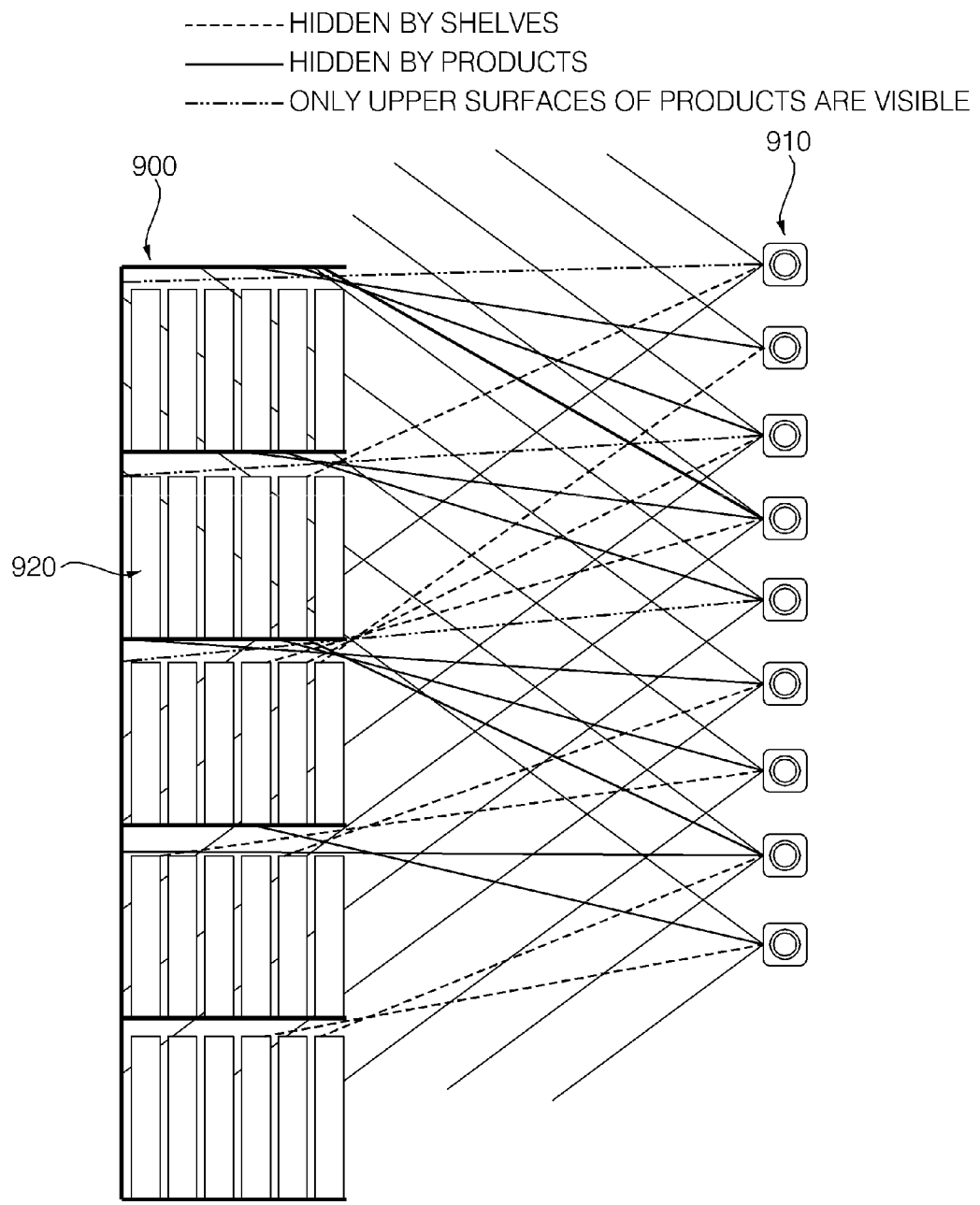

FIG. 9b exemplarily shows the case in which the cameras are tilted, and FIG. 9c exemplarily shows the case in which the cameras are moved. Referring to FIG. 9b, even in the case in which the cameras 901 are rotated downwards, no effect is achieved, and difficulty in image composition is increased. Referring to FIG. 9c, even in the case in which the cameras are moved upwards and downwards, no effect is achieved.

Figure 9D:
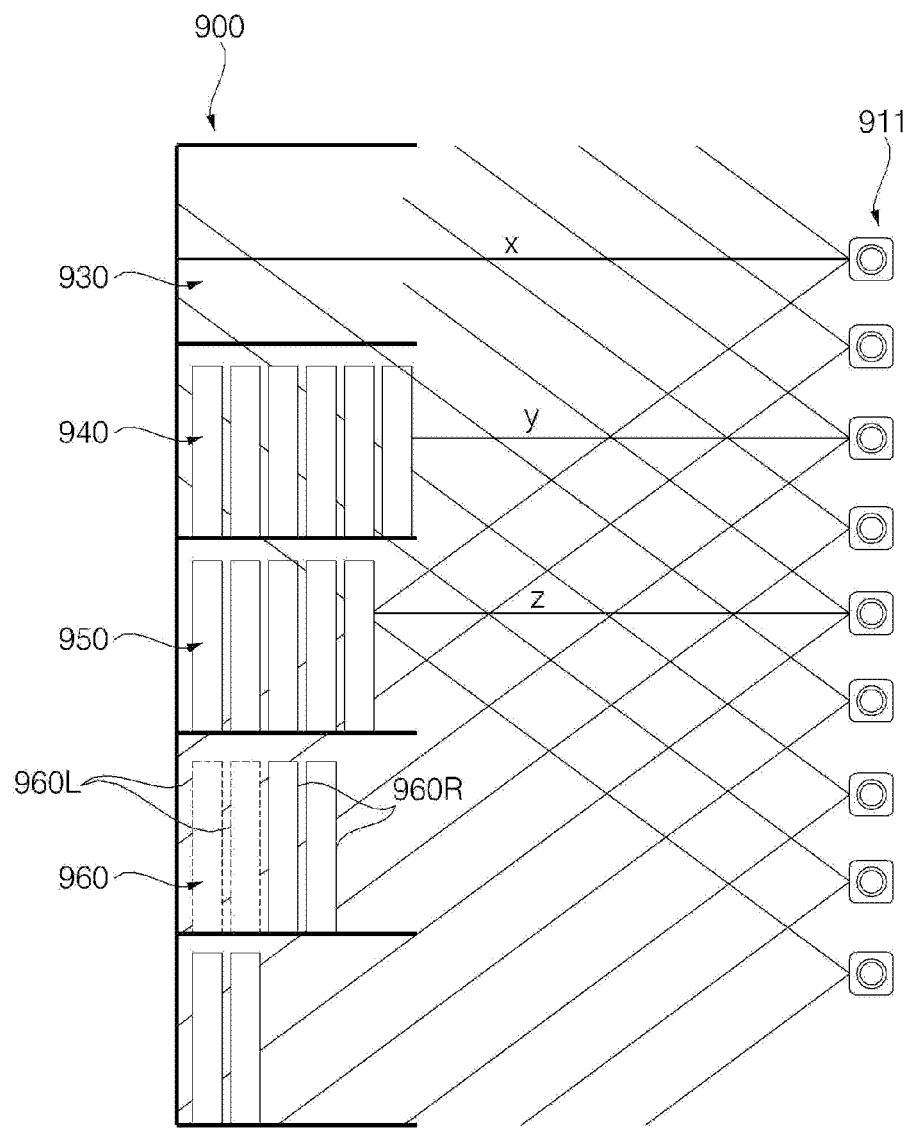

FIG. 9d exemplarily shows the case in which depth cameras 911 are used.

Referring to FIG. 9d, the distance x is measured using the depth cameras 911 in the state in which a specific shelf 930 is empty. In addition, the distance y is measured in the state in which a specific shelf 940 is full, and the quantity n of products in the full state is input. The difference x-y between the distance in the empty state and the distance in the full state may be divided by the quantity n of products in order to calculate the thickness d of each product.

Inversely, the difference z-y between the distance z to a product in a specific shelf 950 and the distance in the full state may be divided by the thickness d of each product in order to calculate the quantity n of products arranged on the specific shelf 950.

In many cases, however, when customers retrieve products arranged at the front of shelves of a display stand 900 in a mart, sales clerks pull the other products forwards. In this case, a rear space 960b is not visible due to front products 960a on a specific shelf 960, whereby it is difficult to count the quantity of products.

In addition, various variables are present. For example, a customer may pick a middle one of the arranged products.

According to the present invention, however, it is possible to accurately count the quantity of products irrespective of whether products are arranged in the inside of the shelf or the quantity of products arranged in the inside of the shelf.

The robot system according to the present invention and the method of controlling the same are not limitedly applied to the constructions and methods of the embodiments as previously described; rather, all or some of the embodiments may be selectively combined to achieve various modifications.

Similarly, although operations are shown in a specific sequence in the drawings, this does not mean that the operations must be performed in the specific sequence or sequentially in order to obtain desired results or that all of the operations must be performed. In a specific case, multitasking and parallel processing may be advantageous.

Meanwhile, the method of controlling the robot system according to the embodiment of the present invention may be implemented as code that can be written on a processor-readable recording medium and thus read by a processor. The processor-readable recording medium may be any type of recording device in which data is stored in a processor-readable manner. In addition, the processor-readable recording medium may be distributed over a plurality of computer systems connected to a network such that processor-readable code is written thereto and executed therefrom in a decentralized manner.

It will be apparent that, although the preferred embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

The invention claimed is:

1. A stock management robot comprising:
    a driving unit configured to move a main body;
    an image acquisition unit comprising at least one camera disposed on one surface of the main body;
    a robot arm, at least a portion of which is extended so as to be far away from the main body, is rotatable at least 90 degrees, is introduced between a shelf and products arranged on the shelf, and is pulled toward the main body; and
    a control unit configured to perform control so that the robot arm is pulled toward the main body until a pressure sensor provided at the robot arm senses a predetermined pressure, and count a quantity of products arranged on the shelf based on a movement distance of the robot arm and a thickness of each product determined from an image of the products acquired through the image acquisition unit,
    wherein the robot arm is extended in a longitudinal direction between the products arranged in a row from a front of the shelf and the shelf, and when the robot arm touches the innermost product, the robot arm is pulled toward the main body to move the products to the front of the shelf, and
    the control unit performs control so that the robot arm is rotated based on at least one of a kind, size, or arrangement form of the products arranged on the shelf so as to be introduced between the shelf and the products arranged on the shelf.

2. The stock management robot according to claim 1, wherein the robot arm is movable in the longitudinal direction of the main body, and
    the control unit performs control so that the robot arm is moved in the longitudinal direction in response to a height of the shelf.

3. The stock management robot according to claim 1, wherein the robot arm comprises:
    a moving unit configured to be pulled toward to the main body after being introduced between the shelf and the products arranged on the shelf;
    a stationary unit, to which the pressure sensor is mounted; and
    a linear actuator for length adjustment.

4. The stock management robot according to claim 3, wherein the control unit
    extends the linear actuator so that the moving unit is introduced between the shelf and the products arranged on the shelf,
    rotates the moving unit when the moving unit reaches a target position, monitors a value sensed by the pressure sensor mounted to the stationary unit while pulling the linear actuator, and
    performs control so that an operation of the linear actuator is stopped when the pressure sensor senses the predetermined pressure.

5. The stock management robot according to claim 3, wherein the moving unit comprises a contact portion configured to contact the products, and at least a product that contacts the contact portion is pulled according to movement of the moving unit.

6. The stock management robot according to claim 3, wherein the stationary unit is fixed to a closest product or to an end of the shelf.

7. The stock management robot according to claim 1, further comprising:
a communication unit configured to communicate with a server, wherein
the control unit performs control so that the communication unit transmits the image of the products acquired through the image acquisition unit or product information identified based on the image of the products acquired through the image acquisition unit to the server and receives information about a thickness of each product from the server.

8. The stock management robot according to claim 1, further comprising:
a communication unit configured to communicate with a server, wherein
the control unit performs control so that information about the quantity of products is transmitted to the server through the communication unit.

9. The stock management robot according to claim 1, wherein the robot arm is received in the main body in a standby state.

10. The stock management robot according to claim 1, wherein the robot arm comprises a pair of robot arms disposed so as to be spaced apart from each other by a predetermined distance.

11. The stock management robot according to claim 10, wherein the robot arms are extended from a left side and a right side of the main body, respectively, in order to pull products between the robot arms toward the main body.

12. The stock management robot according to claim 1, wherein
the image acquisition unit comprises a plurality of cameras disposed in the longitudinal direction of the main body, and
the control unit recognizes the shelf and the products arranged on the shelf based on a panoramic image obtained by composing images acquired through the cameras.

13. The stock management robot according to claim 1, further comprising a storage unit configured to store information about a display stand including the shelf.

14. The stock management robot according to claim 1, wherein when the robot arm is introduced between the shelf and the products arranged on the shelf, an end portion of the robot arm wraps around the products arranged on the shelf.

15. The stock management robot according to claim 14, wherein when the robot arm wraps round the products arranged on the shelf, the end portion of the robot arm wraps and covers at least three different sides of the products arranged on the shelf.

* * * * *